(12) United States Patent
Stautmeister et al.

(10) Patent No.: US 12,181,268 B2
(45) Date of Patent: Dec. 31, 2024

(54) OPTICAL POSITIONING AID FOR A DISTANCE SENSOR, DISTANCE MEASURING SYSTEM AND CORRESPONDING METHOD

(71) Applicant: MICRO-EPSILON Optronic GmbH, Langebrück (DE)

(72) Inventors: Torsten Stautmeister, Dresden-Langebrück (DE); Tobias Schueller, Dresden (DE); Marco Roessler, Radeberg (DE)

(73) Assignee: MICRO-EPSILON Optronic GmbH, Langebrück (DE)

( * ) Notice: Subject to any disclaimer, the term of this patent is extended or adjusted under 35 U.S.C. 154(b) by 187 days.

(21) Appl. No.: 17/914,093

(22) PCT Filed: Feb. 15, 2021

(86) PCT No.: PCT/DE2021/200014
§ 371 (c)(1),
(2) Date: Sep. 23, 2022

(87) PCT Pub. No.: WO2021/190713
PCT Pub. Date: Sep. 30, 2021

(65) Prior Publication Data
US 2023/0111872 A1    Apr. 13, 2023

(30) Foreign Application Priority Data
Mar. 25, 2020   (DE) ..................... 10 2020 203 857.0

(51) Int. Cl.
*G01B 11/14* (2006.01)
(52) U.S. Cl.
CPC .................................. *G01B 11/14* (2013.01)

(58) Field of Classification Search
CPC ...... G01B 11/14; G01B 21/047; G01B 11/26; G01B 11/026; G01B 2210/58
(Continued)

(56) References Cited

U.S. PATENT DOCUMENTS

| 5,886,521 A | 3/1999 | Hassan |
| 9,009,000 B2 | 4/2015 | York et al. |

(Continued)

FOREIGN PATENT DOCUMENTS

| DE | 697 08 369 T2 | 7/2002 |
| DE | 11 2011 100 296 T5 | 1/2013 |

(Continued)

OTHER PUBLICATIONS

International Search Report for Application No. PCT/DE2021/200014, date of mailing May 17, 2021, 7 pages.
(Continued)

*Primary Examiner* — Md M Rahman
(74) *Attorney, Agent, or Firm* — Seed IP Law Group LLP

(57) ABSTRACT

An optical positioning aid for a distance sensor for assisting in the positioning of the distance sensor relative to a measurement object includes a light source and a control unit. The light source is generates a setting light beam having a wavelength in the visible range and is suitable for generating a light spot on a measurement object. The control unit has a distance input and is communicatively connected to the light source to control at least one property of the setting light beam. The control unit evaluates an input value input into the distance input and influences at least one property of the setting light beam on the basis of a result of the evaluation such that the setting light beam allows conclusions to be drawn concerning the input value. A distance measuring system and a method for assisting in the positioning of a distance sensor are also disclosed.

16 Claims, 5 Drawing Sheets

(58) Field of Classification Search
USPC .......................................................... 356/614
See application file for complete search history.

(56) References Cited

U.S. PATENT DOCUMENTS

2018/0051983 A1* 2/2018 Bayer ................ G01B 11/2545
2019/0339069 A1 11/2019 Watanabe et al.

FOREIGN PATENT DOCUMENTS

| DE | 10 2016 115 252 A1 | 2/2018 |
| DE | 11 2018 000 511 T5 | 10/2019 |
| JP | H3-190418 A | 8/1991 |
| JP | 5403972 B2 * | 1/2014 |
| WO | WO-2020011699 A1 * | 1/2020 |

OTHER PUBLICATIONS

International Preliminary Report on Patentability and Written Opinion of the International Searching Authority for Application No. PCT/DE2021/200014, date of issuance Sep. 22, 2022, 10 pages.

* cited by examiner

OPTICAL POSITIONING AID FOR A DISTANCE SENSOR, DISTANCE MEASURING SYSTEM AND CORRESPONDING METHOD

BACKGROUND

Technical Field

The present disclosure relates to an optical positioning aid for a distance sensor for assisting in the positioning of the distance sensor relative to a measured object. The present disclosure further relates to a distance measuring system and a corresponding method.

Description of the Related Art

In many fields of technology, distance sensors are particularly important. Distances between the sensor and a measured object are measured with distance sensors. Not only information about the distance of a measured object from the sensor can be obtained from a measured distance, but also, as a function of the evaluations carried out, information about a profile of the measured object, a layer thickness, a gap width, a surface quality or also just about the presence of a measured object, to name only a few typical examples. The known sensor technologies and the possibilities for analyzing sensor signals are correspondingly varied. Depending on the application area and measured objects to be measured, optical sensors (for example, interferometry sensors, confocal chromatic sensors or triangulation sensors), capacitive or inductive sensors are used.

Distance sensors have a distance measuring range and a lateral measuring range. The distance measuring range indicates the distance between the measured object and the distance sensor from which (minimum measurement distance) and up to which (maximum measurement distance) measurements are possible. The minimum measurement distance can reach up to the distance sensor. In practice, however, the minimum measurement distance is usually spaced apart from the distance sensor. The lateral measuring range indicates in which range a measured object can be measured transversely to the distance measuring range.

In some sensor technologies, the distance measuring range and/or the lateral measuring range can be recognized comparatively easily. For example, triangulation sensors use light in the visible range so that a lateral positioning of a measured object is easily possible. Nevertheless, in this case too, the distance measuring range can often only be guessed. In the case of sensors in which a measurement is carried out outside the visible range, for example in the case of a measuring light in the infrared range or in the case of capacitive or inductive sensors, a correct positioning of a measured object is possible only by using a data sheet and a meter stick (or another comparable measuring device).

Since a precise positioning of the distance sensor is not rarely required during installation of a distance sensor in a machine or a system, the installation frequently becomes a complicated and error-prone activity. This problem is exacerbated even further if the distance measuring range and/or the lateral measuring range is small, for example, the distance measuring range extends only over a few millimeters and the lateral measuring range is less than one millimeter wide. In such cases, positioning without further aids is practically impossible.

In practice, measuring systems are therefore known which have positioning aids in order to assist an installer in the positioning of the distance sensor relative to a measured object. For this purpose, a controller unit of the measuring system has a display which allows a classification of a measured distance value. This display can indicate, for example, by a green LED (light-emitting diode) when a measured distance value is at a center of the measuring range. In this way, the installer can position the distance sensor and the measured object relatively precisely in relation to one another. A disadvantage of this is that the installer always has to switch their gaze back and forth between the distance sensor and the controller unit. A performed adjustment of the distance sensor can only be verified when the display of the controller unit has been consulted. As a result, the setup process can be very complicated and time-consuming.

BRIEF SUMMARY AND INITIAL DESCRIPTION

Disclosed herein is a positioning aid, a distance measuring system, and a method of the type mentioned at the outset, designed in such a way that a positioning of a distance sensor relative to a measured object is made possible in the simplest way possible.

In at least one embodiment, the positioning aid comprises:
- a light source for generating a setting light beam, wherein the setting light beam has a wavelength in the visible range and is suitable for generating a light spot on a measured object, and
- a control unit which has a distance input and is communicatively connected to the light source in order to control at least one property of the setting light beam, wherein the control unit is designed to evaluate an input value input into the distance input and to influence at least one property of the setting light beam on the basis of a result of the evaluation in such a way that the setting light beam allows conclusions to be drawn about the input value.

In at least one embodiment, the distance measuring system i comprises:
- a distance sensor for measuring a distance between the distance sensor and a measured object, and
- an optical positioning aid according to the present disclosure,
- wherein the distance sensor is communicatively connected to the positioning aid and inputs an input value, which is representative of a measured distance value, into the distance input of the positioning aid.

As regards the method, in at least one embodiment, the method comprises:
- generating an input value by measuring a distance between the measured object and the distance sensor,
- evaluating the input value in order to generate a result of the evaluation,
- generating a setting light beam by means of a light source of a positioning aid, and
- directing the setting light beam at the measured object in order to generate a light spot on the measured object,
- wherein at least one property of the setting light beam is influenced on the basis of the result of the evaluation in such a way that the setting light beam allows conclusions to be drawn about the input value.

In a manner according to the present disclosure, it has first been recognized that a simple positionability of a distance sensor can be achieved in that information about a measured distance value is made apparent directly on the measured object. For this purpose, according to the present disclosure, a setting light beam is used, which is designed in such a way that it generates a visible light spot when impinging on a measured object. For this purpose, the setting light beam has at least one wavelength in the visible range, i.e., at a wavelength between 380 nm and 750 nm. In addition, the setting light beam can be influenced in at least one property on the basis of an input distance value in such a way that conclusions about the input distance value can be drawn from the viewing of the light spot. This is achieved in that influencing the at least one property of the setting light beam has an impact in the visible range and thus has an effect, which is recognizable with the naked eye, on the light spot on the measured object.

In order to generate such a setting light beam, a positioning aid which comprises a light source and a control unit is provided according to the present disclosure. Together with a distance sensor (and possibly further assemblies), this positioning aid can form a distance measuring system. The light source generates the setting light beam, which is directed at a measured object and can generate a light spot there. This requirement requires that the light source is designed to generate a sufficiently focused light beam. The control unit has a distance input which can be connected to a distance sensor and into which an input value is input. The control unit is communicatively connected to the light source and is designed to control at least one property of the setting light beam. The control unit evaluates an input value input into the distance input and generates a result of the evaluation in this evaluation. On the basis of the result of the evaluation, the control unit influences the light source in such a way that one or more of the at least one property of the setting light beam allows conclusions to be drawn about the input value. In this way, it is possible to read from the light spot on the measured object how the input value corresponds to the evaluation criteria used in the evaluation of the input value.

The setting light beam can be formed by a monochromatic light beam, i.e., the setting light beam has only a single wavelength or a narrow wavelength range (for example, narrower than 10 nm or narrower than 5 nm). However, it is also conceivable that the setting light beam is polychromatic, i.e., has a plurality of discrete wavelengths and/or one or more wavelength ranges. As long as at least one wavelength of the setting light beam is in the visible range and when a property of the setting light beam is changed, the setting light beam causes changes of a light spot on the measured object that can be recognized by the naked eye, such a setting light beam can be used in connection with the present disclosure.

In principle, the positioning aid and thus the light spot on the measured object can be positioned in different ways. In particular in the case of a positioning aid which is mounted as an external unit on a distance sensor, the light spot may be arranged at a distance from the lateral measuring range of the distance sensor. As long as it is ensured that an installer can recognize the light spot without extensive change in their viewing direction during positioning of the distance sensor, such a position of the light spot can be used. It would be prudent here if a movement of the distance sensor and thus a pivoting of the measuring range also leads to a pivoting of the setting light beam, i.e., when movements of the distance sensor and movements of the positioning aid are coupled. In a preferred embodiment, the light spot is arranged within the lateral measuring range of the distance sensor. In most cases, this should mean that the light spot is on the optical axis of the measuring light.

The control unit can also be designed in different ways. The control unit can be implemented by pure circuit technology, i.e., by means of an interconnection of discrete components (such as resistors, capacitors, transistors) and optionally using integrated circuits (such as logic gates or comparators). In one embodiment, however, the control unit is implemented by a combination of hardware and software. For this purpose, the control unit has a microprocessor, a working memory, a program memory and corresponding interfaces, wherein a computer program, the execution of which enables the control unit to carry out the respective tasks, is stored in the program memory.

The control unit may be responsible exclusively for the positioning aid. However, it is also conceivable that the control unit is part of a different and/or superordinate system. For example, when using the positioning aid in a measuring system, the control unit can fulfill both tasks for the positioning aid and tasks for the distance sensor or other components of the measuring system.

In one embodiment, the at least one property of the setting light beam can be formed by a wavelength of the setting light beam. This means that the control unit can act on the light source in such a way that a color of the setting light beam changes recognizably as a function of the input value. For example, the setting light beam can be red when an input value input into the distance input is outside a target range, for example outside a distance measuring range or outside a center of the measuring range. If it can be deduced from the input value that the distance between the distance sensor and the measured object is within the distance measuring range or close to the center of the measuring range, the setting light beam can, for example, switch to green. It is also conceivable that the wavelength is changed continuously or in several stages, for example in several stages from red to green. In this case, the control unit would classify an input value into a plurality of ranges and, as a function of a recognized range, select a color of the setting light beam and control the light source accordingly.

In another embodiment, the at least one property of the setting light beam can comprise an intensity. This means that the intensity of the setting light beam is changed as a function of the input value and its evaluation. For example, the setting light beam can be controlled to have a different brightness so that a maximum intensity is present when a target value is reached.

In another embodiment, the at least one property of the setting light beam comprises a variation pattern. This means that another property of the setting light beam is changed in different patterns. It is conceivable, for example, that the intensity of the setting light beam is changed as a function of an evaluation of an input value. Thus, at an input value that is far away from the target value, the setting light beam can have a low intensity, for example equal to 0, over wide portions of a variation period. The closer the input value approaches the target value, the more the ratio between low and high intensity could be shifted toward high intensity. In this way, by varying the intensity, it can be clearly recognized how close the input value is to a target value. The same could also be done with respect to the wavelength, for example by switching between two or more wavelengths/wavelength ranges.

In another embodiment, the at least one property of the setting light beam comprises a variation frequency of the setting light beam. This means that another property of the setting light beam is changed and that the frequency of the change is influenced as a function of the input value. For example, the intensity of the input light beam can switch at a low frequency between a low and a high intensity, for example once per second or every two seconds, if the input value is far away from a target value or a target range. The closer the input value approaches the target value or target range, the faster it could be switched between the two intensity values. In this case, two or even more variation frequencies could be used. In this way, it can be recognized how far away the input value is from the target value. A corresponding procedure could be used when switching a wavelength.

The aforementioned embodiments for varying properties of the setting light beam can be combined in any way. In this case, different properties can have different meanings. For example, the setting light beam can assume a red color when the input value is outside a measuring range. As soon as the input value has reached a measuring range, a switch can be made to a green color. The closer the input value comes to a center of the measuring range, the more the ratio between a low intensity and a high intensity could be shifted toward high intensity. The possibilities and combinability of the various approaches will be readily apparent to a person skilled in the art.

The light source can in principle be implemented in various ways. It is essential here that the light source is capable of emitting a sufficiently focused light beam and can be controlled sufficiently well. However, these requirements can be met by different light generators, possibly in combination with downstream optical means. Possible embodiments of the light source include a light-emitting diode (LED) or a laser diode. In this case, a focusing device for influencing the beam path of the setting light beam can be arranged downstream of the actual light generator of the light source.

Furthermore, the light source can comprise further optical means. Such optical means can comprise, for example, color or polarization filters. In one development, such optical means are designed to influence one or more of the properties of the setting light beam. For example, such an optical means can be used to change the intensity of the setting light beam.

The input value which is input into the distance input of the control unit of the positioning aid can be formed in different ways and have different meanings. It is important that the input value has a reference to a detected distance. How concretely this reference is formed is of minor importance.

In one embodiment, the input value is formed by a distance value. This distance value can be directly correlated with a distance between the measured object and the distance sensor and directly denote the distance measured by the distance sensor.

In another embodiment, the input value is formed by an evaluation measure that is representative of a measured distance. For example, the evaluation measure can be greater than 1 when a measured distance value is above a measuring range of the distance sensor. The evaluation measure could assume a decimal value between 0 and 1 if the detected distance is within the measuring range. In this case, a linear relationship (or also a different clear relationship) between the distance value and the evaluation measure could be used. A value less than or equal to 0 could indicate a distance smaller than the minimum measurement distance. In principle, further evaluation measures that are representative of a measured distance could also be used, such as a logic value.

In a further embodiment, the input value can also be formed by a difference of a distance value relative to a reference point within a distance measuring range of the distance sensor. This reference point can, for example, be a center of a measuring range, a beginning of a measuring range, or an end of a measuring range. A difference formed in this way can be present as an absolute value or be normalized to the size of the measuring range.

The positioning aid according to the present disclosure can be part of a distance measuring system according to the present disclosure. For this purpose, the distance measuring system according to the present disclosure comprises, in addition to the optical positioning aid, a distance sensor for measuring a distance between the distance sensor and a measured object. The distance sensor is communicatively connected to the positioning aid and inputs an input value into the distance input of the positioning aid. For this purpose, the distance sensor can have a correspondingly designed unit which generates an input value suitable for the positioning aid and outputs it to the positioning aid.

In the distance measuring system according to the present disclosure, the positioning aid and distance sensor can be formed by two separate units, which are preferably connected to one another (fixedly or also detachably). The positioning aid could thus be fastened to a housing of the distance sensor. In a preferred embodiment, the positioning aid and the distance sensor, however, form a unit, which should usually be expressed by an arrangement of the positioning aid and distance sensor in a common housing.

The setting light beam can in principle be arranged in any manner relative to the measuring range of the distance sensor as long as the setting light beam generates a recognizable light spot on the measured object. In a preferred embodiment, however, the setting light beam and the measuring range of the distance sensor are coupled. This means that in one embodiment, the setting light beam marks the measuring range of the distance sensor, in particular the lateral measuring range of the distance sensor.

In principle, the distance sensor of the distance measuring system according to the present disclosure can be formed in a wide variety of ways and work according to a wide variety of sensor technologies. As long as the distance sensor is capable of generating and outputting a suitable input value for the positioning aid, this distance sensor is in principle suitable for the distance measuring system according to the present disclosure.

In one embodiment, the distance sensor is formed by an optical sensor. This means that the distance sensor emits a measuring light and, on the basis of a detection light, which arises due to reflection of the measuring light on a measured object, the distance of an illuminated point on the surface of the measured object is deduced. The optical sensor can be designed as an interferometry sensor, as a confocal chromatic sensor, as a triangulation sensor or in some other way. Such sensors are well known in practice.

In another embodiment, the distance sensor is formed by a capacitive sensor. Such sensors measure how a measured object located in the measuring range of the sensor influences a sensor capacity. Such a sensor can also be combined with the optical positioning aid since the setting light beam does not influence the measurement of the capacitive sensor.

In another embodiment, the distance sensor is formed by an inductive sensor. An inductive sensor detects the influence of a measured object on an inductance of the sensor, for example by generating eddy currents in the measured object or by changing the permeability in the measuring range of the sensor. The optical positioning aid can also advantageously be combined with such sensors.

When using an optical sensor, the distance measuring system can comprise an optical coupler with which a measuring light beam emitted by the distance sensor and the setting light beam are coupled. In this way, the measuring light beam and the setting light beam can be coupled into a common optical means so that the common optical means can direct both the measuring light beam and the setting light beam to the measured object. In this case, the common optical means is preferably formed by an optical waveguide. Such an embodiment can be used particularly favorably when the distance measuring system comprises a passive measuring head, from which the measuring light is directed at the measured object and which receives reflection light reflected from the measured object. Even if optical errors (for example, chromatic aberrations) may occur as a result of the different wavelengths of the setting light beam and the measuring light beam and as a result of the optimization of the measuring optics to the measuring light beam, good coaxiality of the measuring light beam and the setting light beam can nevertheless be achieved in this way.

When using an optical sensor which emits a measuring light in the visible range, the measuring light beam can be used as a setting light beam in one development. In order to avoid a negative influence on the measurement of the distance sensor, a setting mode can be provided, during which one of the properties of the measuring/setting light beam is varied. In this development, it can be expedient to reduce the number of influenced properties.

In a method according to the present disclosure, which can be used to assist in the positioning of a distance sensor relative to a measured object, preferably using a distance measuring system according to the present disclosure, an input value is generated in a first step. The input value is generated by measuring a distance between the measured object and the distance sensor. In a next step, this input value is evaluated and a result of the evaluation is thereby achieved. The result of the evaluation is used to influence at least one property of a setting light beam. Using these properties, in a next step, a setting light beam is generated by means of a light source of a positioning aid and is directed in a further step at the measured object in order to generate a light spot on the measured object. By influencing at least one property of the setting light beam on the basis of an evaluation of the input value, conclusions can be drawn about the input value from the setting light beam and the light spot generated thereby on the measured object.

In a development of the step of evaluating the input value, the input value is compared with a target value and/or a target range. This comparison can be used to determine how the input value is relative to the target value or target range. It is understood that the input value and the target value/target range should be adapted to one another. This means in particular that the input value and the target value/target range are scaled identically.

In one development, the target value and/or the target range characterizes a distance measuring range of the distance sensor. In one embodiment, the setting light beam is generated with a first set of properties when the input value is within the distance measuring range, and with a second set of properties when the input value is outside the distance measuring range. The first set and the second set of properties are different. In this way, it can be immediately recognized from the setting light beam whether an input value is within or outside the distance measuring range.

In another embodiment, the setting light beam is generated with a third set of properties when the input value is within a characteristic range of the distance measuring range, and with a fourth set of properties when the input value is outside the characteristic range. In this case, third and fourth sets of properties are different from one another. A characteristic range of the distance measuring range is formed in one embodiment by a beginning of the measuring range, in another embodiment by a center of the measuring range, and a still further embodiment by an end of the measuring range. Although the beginning of the measuring range, the center of the measuring range, and the end of the measuring range are in principle concrete distance values, it is recommended in connection with the present disclosure to expand these values into a range. This is because a distance sensor can rarely be positioned precisely in such a way that a center of a measuring range, a beginning of a measuring range, or an end of a measuring range is concretely reached. The characteristic range should thus be wide enough so that a positioning of the distance sensor at these values is possible in practical applications. At the same time, it should be narrow enough to be still sufficiently representative of the respective distance value. Preferably, the characteristic range does not deviate more than 10% of the entire distance measuring range, particularly preferably not more than 5% of the entire distance measuring range and very particularly preferably not more than 3% of the distance measuring range from the beginning of the measuring range, the center of the measuring range or the end of the measuring range.

In principle, the mentioned embodiments of a comparison of an input value with a target value/target range can also be combined with one another. In this case, it is conceivable that the setting light beam is generated with a second set of properties in the case of an input value outside the distance measuring range, with a first set of properties in the case of an input value within the distance measuring range but outside the characteristic range, and with a third set of properties in the case of an input value within the characteristic range of the distance measuring range. In this way, quite detailed information about the input value can be output to an installer by means of the setting light beam without a concrete input value having to be displayed.

BRIEF DESCRIPTION OF THE SEVERAL VIEWS OF THE DRAWINGS

There are various possibilities for designing and developing the teaching of the present disclosure in an advantageous manner. In this regard, with the aid of the drawings, reference is made, on the one hand, to the claims subordinate to the independent claims and, on the other hand, to the following explanation of preferred exemplary embodiments of the present disclosure. Generally preferred embodiments and developments of the teaching are also explained in conjunction with the explanation of the preferred exemplary embodiments of the present disclosure with reference to the drawings. Shown in the drawing are the following:

DETAILED DESCRIPTION

Figure 1:
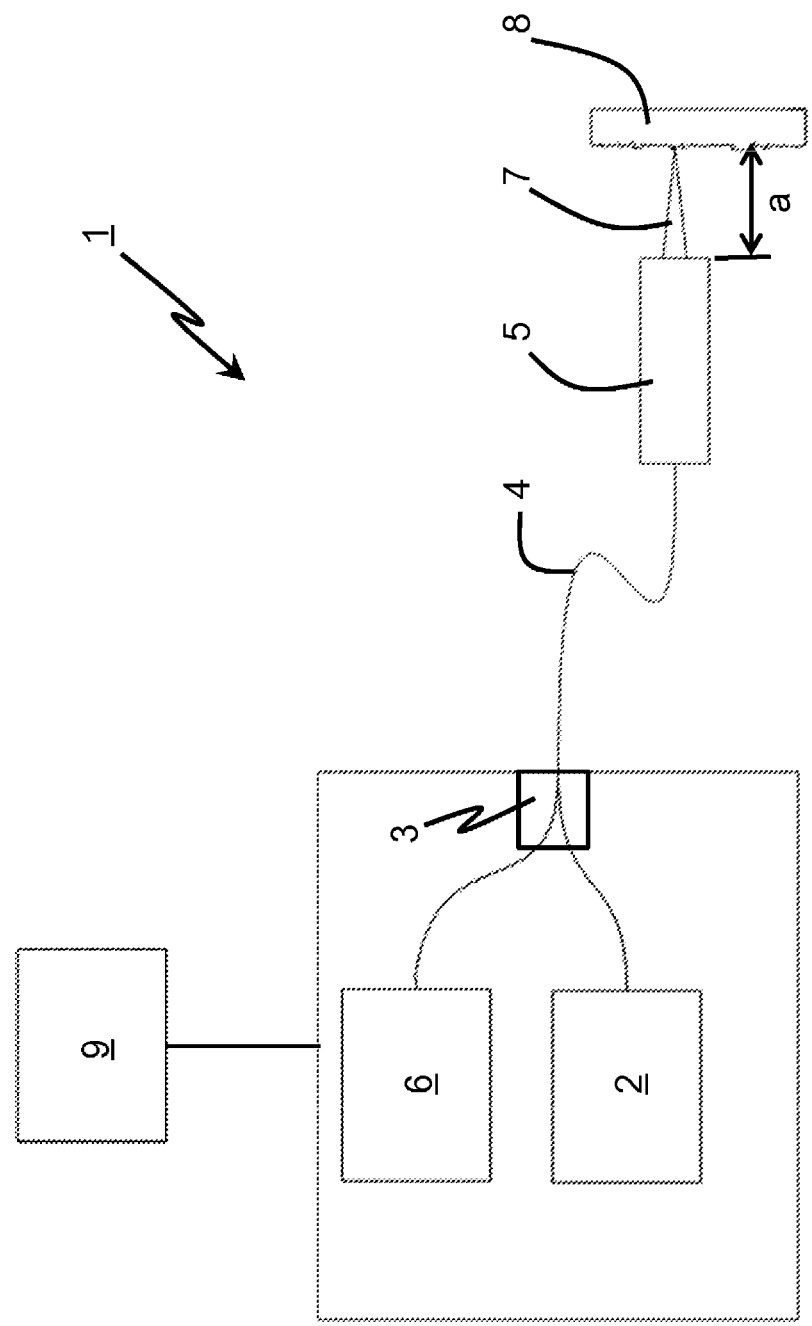
FIG. 1 illustrates a schematic representation of a first exemplary embodiment of a distance measuring system according to the present disclosure with a distance sensor in the form of an interferometry sensor.

FIG. 1 shows a schematic representation of a first exemplary embodiment of a distance measuring system according to the present disclosure. The distance measuring system 1 comprises a distance sensor 2 in the form of a white light interferometry sensor, which generates a polychromatic measuring light in the near infrared range (NIR). The measuring light beam is directed by means of an optical waveguide to an optical coupler 3, at the output of which an optical waveguide 4 is arranged. The optical waveguide 4 forwards the measuring light beam to a measuring head 5. A second input of the optical coupler 3 is connected to a positioning aid 6 which generates a setting light beam and also outputs the setting light beam to the measuring head 5 via the optical coupler 3 and the optical waveguide 4. The measuring head 5 radiates an illumination light beam 7 onto a measured object 8, wherein the illumination light beam 7 is a sum of the measuring light beam and the setting light beam. Since the measuring light beam and the setting light beam use the same measuring optics, both light beams are arranged coaxially to one another. The illumination light beam 7 is reflected at the surface of the measured object 8. The spectral portion of the illumination light beam 7 which is focused on the surface of the measured object 8 passes back into the distance sensor 2 via the measuring head 5, the optical waveguide 4 and the optical coupler 3. The distance a from the measured object 8 is deduced from the received spectral portion. An evaluation unit 9 is used to evaluate, store, and display measured values for a user.

Figure 2:
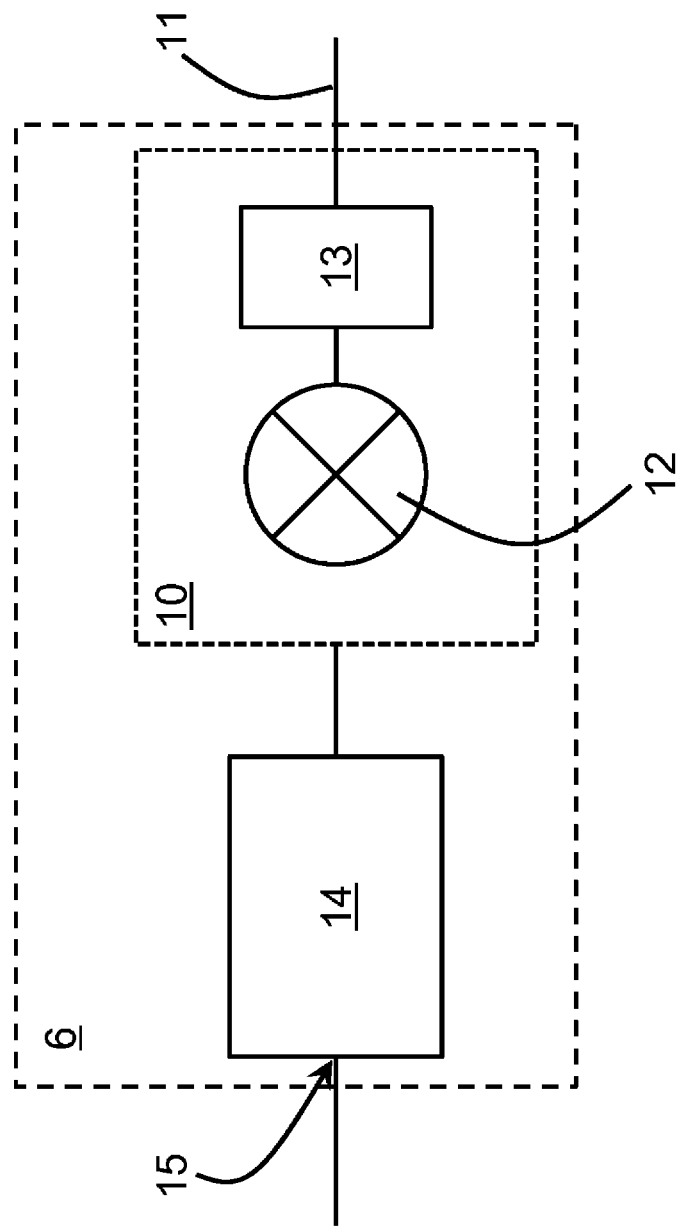
FIG. 2 illustrates a schematic representation of an exemplary embodiment of a positioning aid according to the present disclosure.

FIG. 2 shows the positioning aid 6 again in more detail. The positioning aid 6 has a light source 10 which generates and outputs a setting light beam 11. The light source 10 itself comprises a light generator 12 and an optical means 13. The light generator 12 can be formed by an LED or a laser diode. The optical means 13 can comprise a focusing device or a further optical means for influencing at least one optical property of the setting light beam 11. The positioning aid 6 additionally has a control unit 14 which is communicatively connected to the light source 10. The control unit 14 additionally has a distance input in which an input value representative of a measured distance can be input.

During operation of the distance measuring system 1, the distance sensor 2 generates a measured distance value by measuring the distance a from the measured object 8. This measured distance value is input into the distance input 15 of the control unit 14, possibly using the evaluation unit 9. The control unit 14 is designed to evaluate the input value and to influence at least one property of the setting light beam on the basis of a result of the evaluation so that the setting light beam allows conclusions to be drawn about the input value. By means of the coaxial arrangement of the measuring light beam and the setting light beam, the lateral measuring range of the distance sensor 2 can be deduced by means of a light spot generated by the setting light beam on the surface of the measured object 8. Even if the measuring light beam is outside the visible range, a correct positioning of the distance measuring system 1 relative to the measured object 8 can be deduced by the setting light beam 11 in the visible range and by influencing at least one property of the setting light beam on the basis of the input value.

Figure 3:
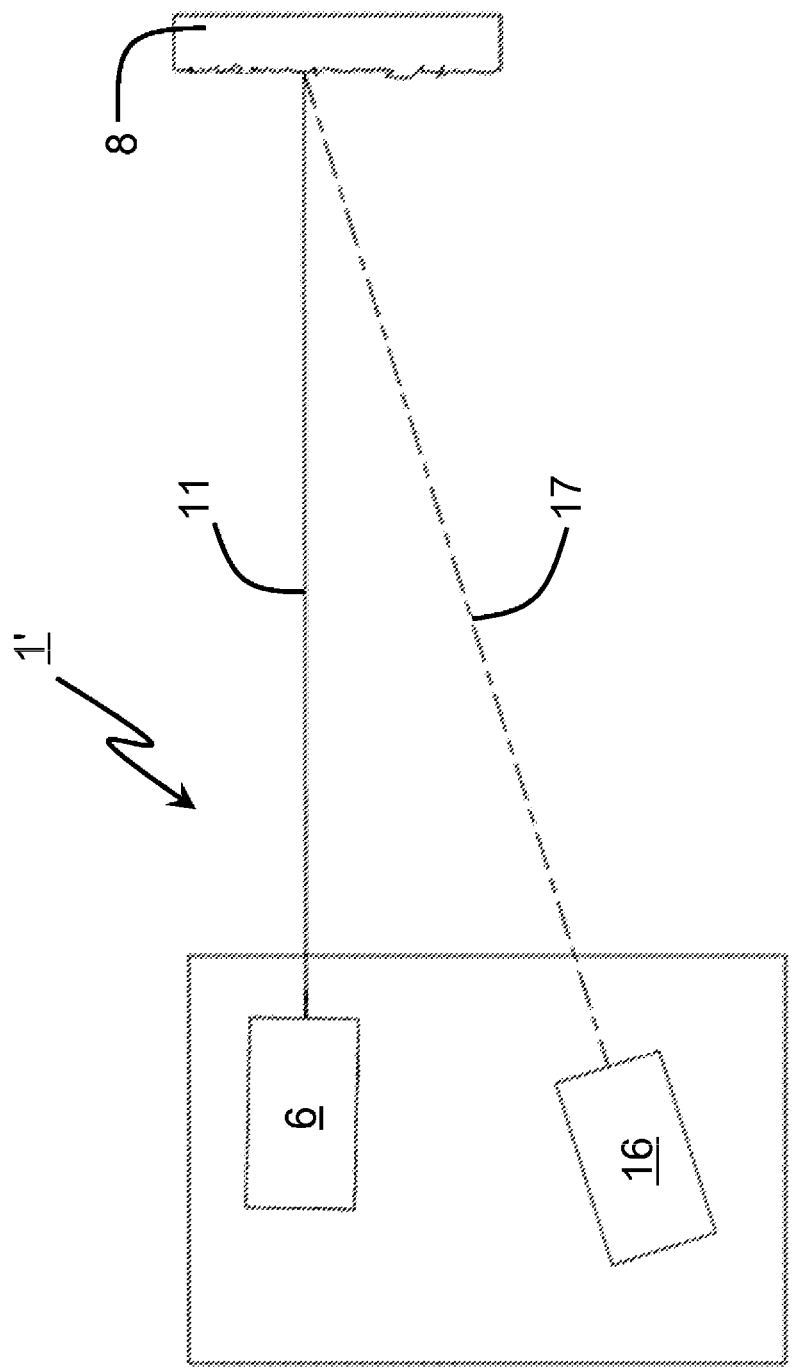
FIG. 3 illustrates a schematic representation of a second exemplary embodiment of a distance measuring system according to the present disclosure with a distance sensor in the form of a triangulation sensor.

FIG. 3 schematically depicts a second exemplary embodiment of a distance measuring system 1' according to the present disclosure, wherein the distance sensor is designed as a triangulation sensor 16. For the sake of clarity, only the light source for generating the measuring light beam 17, but not the detection unit of the sensor, is shown. In this exemplary embodiment too, a positioning aid 6 is provided, which generates a setting light beam 11 and radiates it in the direction of the measured object 8. Since the illumination light beam 11 and the measuring light beam 17 form a triangle, the setting light beam only roughly marks the lateral measuring range of the triangulation sensor 16. However, the measuring light beam 17 of a triangulation sensor 16 is in the visible range so that the lateral measuring range of the distance measuring system 1' can be seen from the measuring light beam 17. In this case, the setting light beam 11 serves exclusively for making the distance measuring range recognizable.

In one development of this second exemplary embodiment, an optical coupler can be used as in the first exemplary embodiment, which coupler couples the measuring light beam and the setting light beam coaxially, for example. It is also conceivable that no separate positioning aid is used, but that the positioning aid is an integral component of the triangulation sensor, i.e., the measuring light beam is used as a setting light beam in a setting mode and varies in its intensity as a function of a measured distance, for example.

Figure 4:
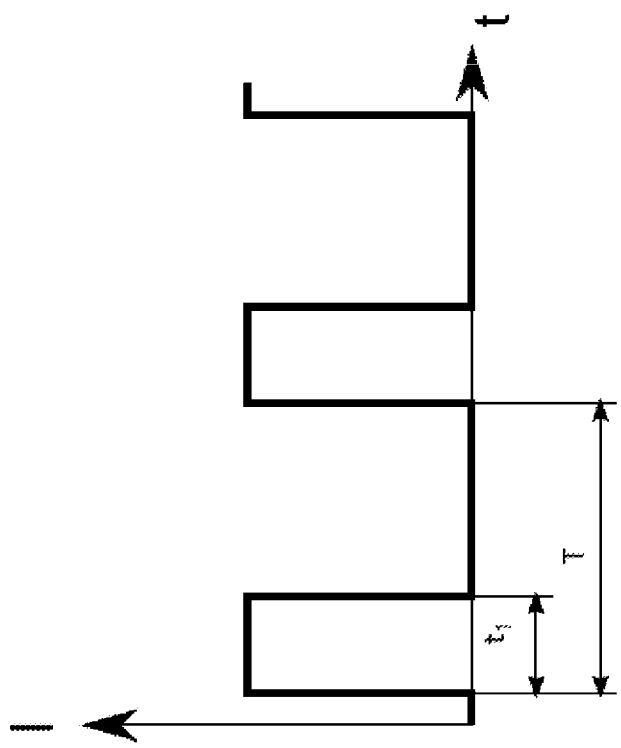
FIG. 4 illustrates a diagram showing an exemplary curve of a variation of the pulse duration and/or of the duty cycle of a setting light beam.

In FIGS. 4 to 7, four options of how a property of the setting light beam can be changed are shown by way of example. In FIG. 4, the intensity of the setting light beam is varied over time between an upper intensity value $I_0$ and an intensity value equal to 0. The period length T of the variation and thus the variation frequency can be selected as a function of a measured distance value.

Figure 5:
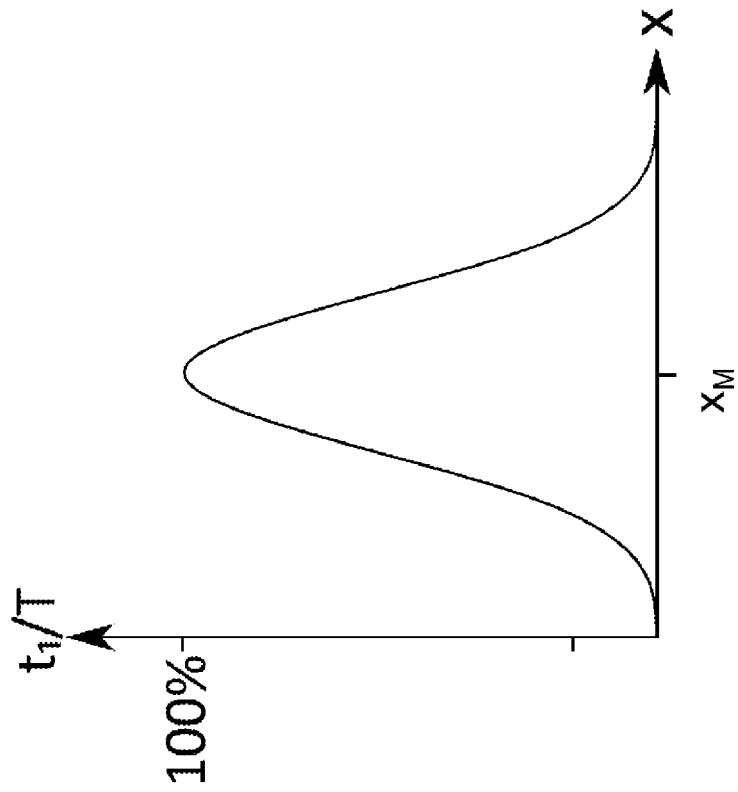
FIG. 5 illustrates a diagram showing an exemplary curve of an intensity by varying a duty cycle as a function of a measurement path x.

FIG. 5 shows a different change in the intensity as a function of a measurement path x, namely by changing the duty cycle $t_1/T$. In this case, $t_1$ denotes the period of time during which the intensity assumes an upper intensity value $I_0$. The period length T can be kept constant. The further a measured distance deviates from the center of the measuring range $x_M$, the more quickly the intensity assumes the upper intensity value $I_0$. At a duty cycle of 100%, the upper intensity value $I_0$ is used continuously. With a period length T in the range of seconds, a setting light beam is produced in this way, which pulses less and less when the center of the measuring range is reached. In the case of short period lengths, for example in the range of 10 milliseconds or below, the setting light beam always appears to become brighter, the closer the measurement path comes to the center of the measuring range $x_M$.

Figure 6:
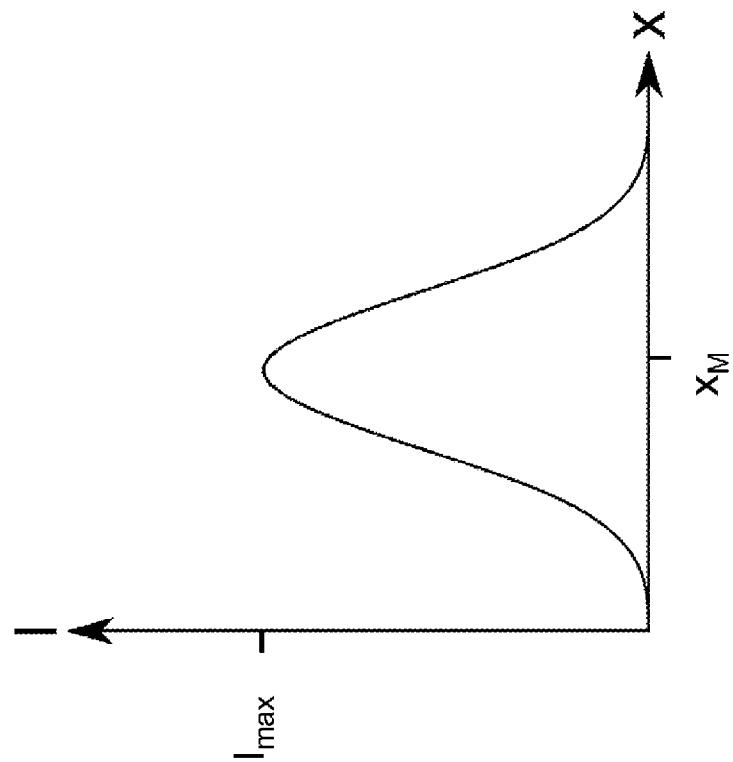
FIG. 6 illustrates a diagram showing an exemplary curve of an intensity as a function of a measurement path x.

In FIG. 6, the intensity I is changed as a function of a measurement path x. In the area of a center of a measuring range $x_M$, a maximum intensity $I_{max}$ of the setting light beam is reached. The further a measured distance deviates from the center of the measuring range $x_M$, the further the intensity I decreases. In the example shown, the intensity has a dependence on the measured value in the form of a bell curve.

Figure 7:
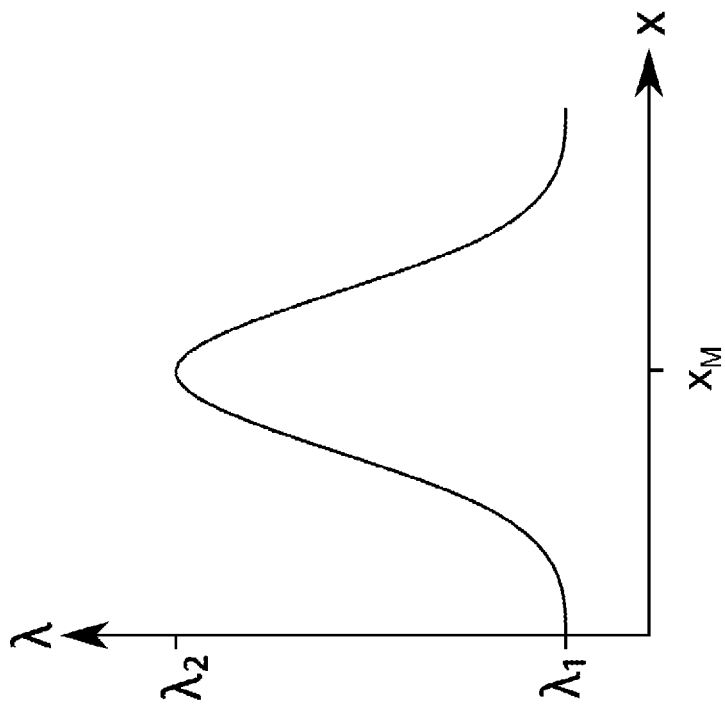
FIG. 7 illustrates a diagram showing an exemplary curve of a variation of the wavelength of a setting light beam.

FIG. 7 shows a quite similar dependence. However, here, the wavelength λ of the setting light beam is varied continuously (or semi-continuously) between a lower wavelength value $λ_1$ and an upper wavelength value $λ_2$ as a function of the measurement path x. In this case, the upper wavelength value $\lambda_2$ is reached in the center of the measuring range $x_M$.

With regard to other advantageous embodiments of the positioning aid according to the present disclosure and of the distance measuring system according to the present disclosure, reference is made to the general portion of the description and the appended claims, to avoid repetition.

Finally, it is expressly pointed out that the above-described exemplary embodiments serve only to explain the claimed teaching but do not restrict it to the exemplary embodiments.

LIST OF REFERENCE SIGNS

1 Distance measuring system
2 Distance sensor
3 Optical coupler
4 Optical waveguide
5 Measuring head
6 Positioning aid
7 Illumination light beam
8 Measured object
9 Evaluation unit
10 Light source
11 Setting light beam
12 Light generator
13 Optical means
14 Control unit (of the positioning aid)
15 Distance input
16 Triangulation sensor
17 Measuring light beam The various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A distance measuring system comprising:
   a distance sensor for measuring a distance between the distance sensor and a measured object; and
   an optical positioning aid for the distance sensor for assisting in the positioning of the distance sensor relative to the measured object, comprising:
      a light source for generating a setting light beam, wherein the setting light beam has a wavelength in a visible range and is suitable for generating a light spot on the measured object, and
      a control unit which has a distance input and is communicatively connected to the light source in order to control at least one property of the setting light beam,
      wherein the control unit is designed to evaluate an input value input into the distance input and to influence at least one property of the setting light beam on the basis of a result of the evaluation in such a way that the setting light beam allows conclusions to be drawn about the input value;
   wherein the distance sensor is communicatively connected to the optical positioning aid and inputs an input value that is representative of a measured distance value, into the distance input of the optical positioning aid, and
   wherein the distance sensor is formed by an optical sensor,
   the distance measuring system further comprising an optical coupler that couples a measuring light beam emitted by the distance sensor and the setting light beam to enable a common optical means to direct the measuring light beam and setting light beam to the measured object.

2. The distance measuring system according to claim 1, wherein the setting light beam is arranged relative to the distance sensor in such a way that the setting light beam marks a lateral measuring range of the distance sensor.

3. The distance measuring system according to claim 1, wherein the optical sensor emits a measuring light beam that is used as a setting light beam during a setting mode of the sensor.

4. The distance measuring system according to claim 1, wherein the distance sensor is a capacitive sensor or an inductive sensor.

5. A method for assisting in the positioning of a distance sensor relative to a measured object, wherein the method is performed using a distance measuring system according to claim 1, comprising the steps of:
   generating an input value by measuring a distance between the measured object and the distance sensor,
   evaluating the input value in order to generate a result of the evaluation,
   generating the setting light beam by the light source of the optical positioning aid, and
   directing the setting light beam at the measured object in order to generate the light spot on the measured object,
   wherein the at least one property of the setting light beam is influenced on the basis of the result of the evaluation such that the setting light beam allows conclusions to be drawn about the input value.

6. The method according to claim 5, wherein the input value is compared with a target value and/or a target range in the step of evaluating the input value.

7. The method according to claim 6, wherein the target value and/or the target range characterizes a distance measuring range of the distance sensor, wherein, in the case of an input value within the distance measuring range, the setting light beam is generated with a first set of properties and, in the case of an input value outside the distance measuring range, the setting light beam is generated with a second set of properties, wherein the first and second sets of properties are different from one another.

8. The method according to claim 6, wherein the target value and/or the target range characterizes a distance measuring range of the distance sensor, wherein, in the case of an input value within a characteristic range of the distance measuring range, the setting light beam is generated with a third set of properties and, in the case of an input value outside the characteristic range, the setting light beam is generated with a fourth set of properties, wherein the third and fourth sets of properties are different from one another.

9. The method according to claim 8, wherein the characteristic range of the distance measuring range is a beginning of the measuring range, a center of the measuring range, or an end of the measuring range.

10. The distance measuring system according to claim 1, wherein the at least one property of the setting light beam comprises a wavelength, an intensity, a variation pattern, and/or a variation frequency of the setting light beam.

11. The distance measuring system according to claim 1, wherein the light source comprises a light generator and a focusing device for influencing a beam path of the setting light beam.

12. The optical positioning aid according to claim 11, wherein the light generator is a light-emitting diode or a laser diode.

13. The distance measuring system according to claim 1, wherein the light source comprises an optical means for influencing the at least one property of the setting light beam.

14. The distance measuring system according to claim 1, wherein the input value is formed by a measured distance value, an evaluation measure representative of a measured distance, or a difference of a measured distance value relative to a reference point in a distance measuring range of the distance sensor.

15. The distance measuring system according to claim 1, wherein the optical sensor is an interferometry sensor, a confocal chromatic sensor, or a triangulation sensor.

16. The distance measuring system according to claim 1, wherein the common optical means is an optical waveguide.

\* \* \* \* \*